United States Patent
Lin Sörstedt et al.

(10) Patent No.: US 11,555,705 B2
(45) Date of Patent: Jan. 17, 2023

(54) LOCALIZATION USING DYNAMIC LANDMARKS

(71) Applicant: Zenuity AB, Gothenburg (SE)

(72) Inventors: Joakim Lin Sörstedt, Gothenburg (SE); Andreas Schindler, Gothenburg (SE); Tony Gustafsson, Askim (SE)

(73) Assignee: Zenuity AB, Gothenburg (SE)

( * ) Notice: Subject to any disclaimer, the term of this patent is extended or adjusted under 35 U.S.C. 154(b) by 229 days.

(21) Appl. No.: 16/655,451

(22) Filed: Oct. 17, 2019

(65) Prior Publication Data

US 2020/0124422 A1 Apr. 23, 2020

(30) Foreign Application Priority Data

Oct. 23, 2018 (EP) ..................................... 18202128

(51) Int. Cl.
*G01C 21/30* (2006.01)
(52) U.S. Cl.
CPC ..................................... *G01C 21/30* (2013.01)
(58) Field of Classification Search
CPC ....................................................... G01C 21/30
See application file for complete search history.

(56) References Cited

U.S. PATENT DOCUMENTS

| | | | |
|---|---|---|---|
| 10,062,290 B2* | 8/2018 | Dry | H04N 5/44 |
| 10,753,757 B2* | 8/2020 | Tsurumi | B60W 40/10 |
| 2013/0261947 A1* | 10/2013 | Yamashiro | G08G 1/163 |
| | | | 701/300 |
| 2017/0217434 A1 | 8/2017 | Halder et al. | |
| 2017/0261325 A1 | 9/2017 | Schroeder et al. | |
| 2018/0113472 A1* | 4/2018 | Sakr | G05D 1/0276 |

FOREIGN PATENT DOCUMENTS

| | | |
|---|---|---|
| EP | 3358550 A1 | 8/2018 |
| WO | WO-2008009966 A2 * | 1/2008 ............. G01C 21/30 |

OTHER PUBLICATIONS

Extended European Search Report dated Apr. 30, 2019 for European Patent Application No. 18202128.7, 9 pages.

* cited by examiner

*Primary Examiner* — Rami Khatib
*Assistant Examiner* — Shahira Baajour
(74) *Attorney, Agent, or Firm* — Sage Patent Group

(57) ABSTRACT

A method, system and computer program product for determining a map position of an ego-vehicle are disclosed. The method includes acquiring map data comprising a road geometry, initializing at least one dynamic landmark by measuring a position and velocity, relative to the ego-vehicle, of a surrounding vehicle, and determining a first map position of the surrounding vehicle based on this measurement and the geographical position of the ego-vehicle. Further, the method includes predicting a second map position of the surrounding vehicle, and measuring a location, relative to the ego-vehicle, of the surrounding vehicle when it is estimated to be at the second map position, whereby the geographical position of the ego-vehicle can be computed and updated.

12 Claims, 3 Drawing Sheets

LOCALIZATION USING DYNAMIC LANDMARKS

CROSS-REFERENCE TO RELATED APPLICATIONS

The present application for patent claims priority under 35 U.S.C. § 119 to European Patent Office Application Ser. No. 18202128.7, entitled "Localization using dynamic landmarks" filed Oct. 23, 2018, assigned to the assignee hereof, the disclosure of which is hereby incorporated herein by reference as if set forth in its entirety.

TECHNICAL FIELD OF THE INVENTION

The present invention relates to a method, system and computer program product for determining a position of a vehicle in a map.

BACKGROUND

During these last few years, the development of autonomous vehicles has exploded and many different solutions are being explored. Today, development is ongoing in both autonomous driving (AD) and advanced driver-assistance systems (ADAS), i.e. semiautonomous driving, within a number of different technical areas within these fields. One such area is how to position the vehicle with accuracy and consistency since this is an important safety aspect when the vehicle is moving within traffic.

An important requirement on autonomous and semi-autonomous vehicles is that they have the ability to accurately estimate the road geometry ahead, and there are two generally different ways to do this: either using forward-looking sensors that directly perceive the road geometry, or using a map that contains the road geometry (often referred to as an HD-map) together with a module that estimates the vehicle's position in the map.

Conventionally, satellite based positioning systems (Global Navigation Satellite Systems, GNSS), like for instance Global Positioning System (GPS), Globalnaya Navigazionnaya Sputnikovaya Sistema (GLONASS), Galileo, Beidou, have been used for positioning purposes. However, these and other regional systems are often not accurate enough to rely on solely for determining a position of a moving vehicle in autonomous road vehicle applications. Moreover, GNSS based solutions have even less accuracy in determining height information.

Other solutions involve a combination of GNSS data together with vehicle IMU (inertial measurement unit) signals which often can suffer from large scale and bias errors resulting in positioning errors of several meters. Additionally, these methods and systems do not work in scenarios of poor or no satellite connections such as in tunnels or close to tall buildings.

Alternatively, there are systems and methods which utilize a number of different sensors to increase the reliability of map position such as cameras, LIDAR, RADAR, and other sensors for determining vehicle travelling parameters such as speed, angular rate and so on. However, even when the position and the instantaneous direction of the vehicle is known, the forward travel of the vehicle can still be difficult to predict or estimate, in for instance an area with overlapping roads or when different road segments are located close to each other.

To this end, solutions which employ a landmark based positioning approach are suggested. Here, external sensors are used to detect stationary objects (referred to as landmarks) that also are available in the map. The vehicle's position is then estimated by sequentially comparing the sensor data with where these landmarks are according to the map. Examples of landmarks that both typically are available in an HD-map, and detectable by most automotive grade sensors are for example lane markings, road edges, traffic signs, traffic lights, barriers, etc.

However, a problem with landmark based positioning is that sometimes there is not a sufficient amount of landmarks available to determine the vehicle's position with adequate accuracy. This is common in situations where there are no landmarks in the map (e.g. while traveling on rural roads), or if they are not detected by the sensors. In reference to the latter, the landmarks may for example not be detected because of dense traffic, unexpected obstructions (such as landmarks being covered by snow, ice or dirt), or because the landmarks have been moved or damaged.

There is therefore a need for improvements in the art, and in particular there is a need for a system and method which can more accurately and/or robustly determine the position of a vehicle in the map than currently known systems and methods.

SUMMARY OF THE INVENTION

It is therefore an object of the present invention to provide a method for determining a map position of an ego-vehicle, a corresponding vehicle control system and computer program product, and a vehicle comprising such a vehicle control system, which alleviate all or at least some of the above-discussed drawbacks of presently known systems.

This object is achieved by means of a method, vehicle control system, computer program product and vehicle as defined in the appended claims. The term exemplary is in the present context to be understood as serving as an instance, example or illustration.

According to a first aspect of the invention there is provided a method for determining/estimating a map position of an ego-vehicle, the ego-vehicle having a geographical position comprising a set of geographical coordinates of the ego-vehicle, wherein the method comprises acquiring map data comprising a road geometry of a surrounding environment of the ego-vehicle. The method comprises initializing at least one dynamic landmark by measuring a position and velocity, relative to the ego-vehicle, of one or more surrounding vehicles located in the surrounding environment of the ego-vehicle and determining a first map position of the surrounding vehicle(s) based on the measured position of the surrounding vehicle(s) and the geographical position of the ego-vehicle. Further, the method comprises predicting a second map position of each surrounding vehicle, based on the determined first map position of each surrounding vehicle, the measured velocity of each surrounding vehicle, and the road geometry. The method comprises measuring a location, relative to the ego-vehicle, of each surrounding vehicle, when the surrounding vehicle(s) is/are estimated to be at the second map position. Furthermore, the method comprises updating the geographical position of the ego-vehicle based on the predicted second map position of each surrounding vehicle and the measured location of each surrounding vehicle.

By means of the proposed method, it is possible to accurately determine a map position of a vehicle even in areas with poor satellite coverage and/or areas with an insufficient amount of "stationary" landmarks available. In particular, the method is applicable in systems where the vehicle is capable of navigating/driving by using a map that contains the road geometry (often referred to as an HD-map). In more detail, the method enables the use of surrounding vehicles for determining a current map position of the ego-vehicle, by treating the surrounding vehicles as a form of "dynamic" landmarks ("dynamic" is used to differentiate from conventional "stationary" landmarks, such as e.g. road signs, traffic lights, barriers, etc.).

A vehicle in the present context may be any type of suitable road vehicle, such as e.g. a car, a bus, a truck, etc.

An advantage of the presented method is that it allows for an increased robustness/redundancy in a vehicle localization system suitable for autonomous or semi-autonomous driving. In comparison to presently known solutions, the increase in robustness may particularly be achieved in scenarios where there are a few or no landmarks available/detectable, and/or in scenarios where a vehicle sensor is malfunctioning and landmark identifications cannot be performed (while radar measurements of surrounding vehicles are still possible). Sensor malfunction may for example be that one or more cameras of the vehicle are blinded by the sun.

Geographical position of the ego-vehicle is in the present context to be construed as a map position (may also be referred to as in-map position) of the ego-vehicle. In other words, a geographical position or map position can be understood as a set (two or more) of coordinates in a global coordinate system. The surrounding environment of the ego-vehicle can be understood as a general area around the ego-vehicle in which objects (such as other vehicles, landmarks, obstacles, etc.) can be detected and identified by vehicle sensors (radar, LIDAR, cameras, etc.), i.e. within a sensor range of the ego-vehicle.

Further, the terms position and location are used interchangeably and synonymously in the present disclosure, with a purpose of differentiating between the initialization phase (determining a map position of a surrounding vehicle), and the subsequent localization phase (determining a map position of the ego-vehicle based on the predicted map position of the surrounding vehicle and the relative position of the ego-vehicle in reference to the surrounding vehicle). Thus, the term location may be construed as a particular place or position.

The present invention is at least partly based on the realization that in order to be able to move closer to the vision of fully autonomous vehicles, it would be advantageous to provide further alternatives for increasing the redundancy of presently known systems so that one can ensure accurate "in-map positioning" of the vehicle in any situation. Meaning that the vehicle must be able to "know" exactly where it is even in areas of poor satellite coverage and areas with an inadequate number of stationary landmarks. Thus, the inventors realized that it is possible to make use of surrounding traffic for positioning of the ego-vehicle in the map. In more detail, the inventors realized that, even though surrounding vehicles cannot be considered as stationary/static landmarks that can be compared to a known map-position, they can be construed as dynamic landmarks having a lateral position in the lane that changes slowly.

In a more illustrative example, the method can be understood as that the position of one or more surrounding vehicle is/are firstly determined in a local coordinate system of the ego-vehicle (i.e. the position of each surrounding vehicle is determined in reference to the ego-vehicle). However, since the geographical coordinates of the ego-vehicle are known, the position of the surrounding vehicle in the local coordinate system can be transformed to a global/map coordinate system, and the "dynamic landmarks" can then also be determined in a map. Further, the relative measurement of the surrounding vehicle (position and velocity) is used together with the road geometry to predict/estimate a new map position of each surrounding vehicle. This can be done repeatedly after each measurement of the position and velocity of each surrounding vehicle relative to the ego-vehicle, whereby the surrounding vehicles can be "tracked" on the map. In other words, each measurement after the initialization, of each surrounding vehicle's position relative to the ego-vehicle, can be used to determine/estimate a geographical position of the ego-vehicle and simultaneously to predict the next map position of each surrounding vehicle. The step of predicting the second map position of the surrounding vehicle may further be based on an acceleration of the surrounding vehicle. The acceleration may for example be calculated from the measured velocity of the surrounding vehicle.

The proposed method primarily serves the purpose of increasing robustness of presently known localization methods in general, but also to act as a type of fail-safe alternative for conventionally known methods as exemplified in the foregoing.

In accordance with an exemplary embodiment of the present invention, the method further comprises determining the set of geographical coordinates of the ego-vehicle by means of a Global Navigation Satellite System, GNSS. As a prerequisite, the position in the map (geographical position) of the ego-vehicle may be determined by a satellite-based system, such as e.g. GPS, GLONASS, or any other regional GNSS.

Moreover, additionally, or alternatively the determination of the set of geographical coordinates of the ego-vehicle may further comprise measuring the ego-vehicle's specific force and angular rate and comparing the measured specific force and angular rate with the road geometry in order to determine the set of geographical coordinates of the ego-vehicle. In other words, an internal IMU unit of the ego-vehicle may be used to determine the initial map position of the ego-vehicle. This may be advantageously used in combination with the above-mentioned GNSS system in order to increase the accuracy of the map positioning of the ego-vehicle.

Further, in accordance with another exemplary embodiment of the present invention, the map data further comprises stationary landmark location coordinates for at least one stationary landmark in the surrounding environment of the ego-vehicle, and wherein the method further comprises determining the set of geographical coordinates of the ego-vehicle by measuring a stationary landmark position, relative to the ego-vehicle, of the at least one stationary landmark and comparing the measured stationary landmark position and the stationary landmark location coordinates.

By using the dynamic landmarks (i.e. surrounding vehicles) together with the stationary landmarks, a more robust positioning/localization method can be achieved. In particular, the map data contains the geographical coordinates of one or more stationary landmarks in the surrounding environment of the vehicle, and by measuring the ego-vehicle's position relative to one or more of these stationary landmarks it is possible to compute the ego-vehicle's geographical coordinates (i.e. map position) with high precision. Stated differently, the relative stationary landmark measurement is transformed from a "vehicle coordinate system" to a global/map coordinate system.

Moreover, the combination of dynamic landmarks and stationary landmarks can be used for increasing the accuracy of the ego-vehicle geographical position estimation, and specifically to increase robustness of the overall positioning method for scenarios where there are no or only a few stationary landmarks available.

Furthermore, the method may comprise a weighting process, wherein the positioning determining by means of dynamic landmarks and the positioning determining by means of stationary landmarks are weighted with different factors depending on a predefined weighting criteria. The weighting criteria may for example be data quality or data availability in terms of how many dynamic/stationary landmarks are available in the surrounding environment, and of what quality.

Even further, in accordance with yet another exemplary embodiment of the present invention, the step of initializing a dynamic landmark further comprises detecting and selecting a surrounding vehicle in the surrounding environment of the ego-vehicle based on a predefined selection criteria. The step of initializing the dynamic landmark further comprises wherein the step of measuring the position and velocity, relative to the ego-vehicle, of the surrounding vehicle comprises measuring a position and velocity of the selected surrounding vehicle, relative to the ego-vehicle and wherein the step of measuring a location, relative to the ego-vehicle, of the surrounding vehicle comprises measuring a location of the selected surrounding vehicle, relative to the ego-vehicle (when the surrounding vehicle is estimated to be at the predicted second map position). Accordingly, the method may be further optimized in order to primarily focus on suitable surrounding vehicles in order to further increase accuracy, efficiency and potentially save processing power. For example, some surrounding vehicles may be inappropriate "dynamic landmarks", such as if they are traveling in an opposite direction or much faster/slower than the ego-vehicle, meaning that they will soon be out of range for the relative measurements and not particularly reliable references points for the ego-vehicle's positioning. Thus, the predefined selection criteria may be at least one of the velocity of the surrounding vehicle is V±10%, where V is the velocity of the ego-vehicle, a traveling direction of the surrounding vehicle is substantially the same as the ego-vehicle and a relative distance between the surrounding vehicle and the ego-vehicle is below a predefined threshold distance. As discussed in the foregoing, it may be advantageous to limit the pool of surrounding vehicles which are to be initialized as dynamic landmarks and subsequently used as reference points for the map positioning of the ego-vehicle. In particular, it may be advantageous to focus on one or more surrounding vehicles which will be within range to perform relative measurements for a longer duration of time (in contrast to e.g. a vehicle traveling in the opposite direction or substantially faster/slower than the ego-vehicle).

Yet further, in accordance with another exemplary embodiment of the present invention, the method further comprises forming a state vector for computing the geographical position of the ego-vehicle, the state vector comprising a set of vehicle elements representative of the geographical coordinates of the ego-vehicle and an orientation of the ego-vehicle. Forming a state vector representing the geographical position and orientation of the vehicle provides for a simple and efficient base for a future estimation/determination of the ego-vehicle's position. Without any other input parameters (such as stationary or dynamic landmarks), the state vector x can for example contain a pose of the vehicle. The pose is here defined as a 2D Cartesian position $(\xi x, \xi y)$ and an orientation $\theta$ of the ego-vehicle. Accordingly, the state vector can be expressed as $x=[\xi x, \xi y, \theta]^T$. Therefore, in accordance with yet another exemplary embodiment of the present invention, the step of updating the geographical position comprises updating the set of ego-vehicle elements in the state vector.

The state vector may subsequently be extended such that it includes the position of one or more surrounding vehicles.

Therefore, in accordance with yet another exemplary embodiment, wherein the step of determining a map position of the surrounding vehicle comprises extending the state vector so to include new elements representative of the map position of the surrounding vehicle and wherein the step of predicting the map position of the surrounding vehicle further comprises updating the elements representative of the map position of the surrounding vehicle in the state vector. Accordingly, the state vector may then be expressed as $x=[\xi_x, \xi_y, \theta, (X_1, Y_1), (X_2, Y_2) \ldots (X_N, Y_N)]^T$, for N surrounding vehicles, where $(X_i, Y_i)$ denotes a map position of the i'th surrounding vehicle. The number and type of elements that relate to each surrounding vehicle depend on the filter choice for computing the state vector, and should not be limited to this particular example.

Moreover, the method may comprise a step of updating each set of elements associated with the surrounding vehicle in the state vector after each measurement. This will enable a sort of "tracking" of the surrounding vehicle(s) in the map.

Further, in accordance with yet another exemplary embodiment of the present invention, the step of predicting a map position of the surrounding vehicle is further based on a predefined vehicle motion model. This is in order to be able to predict the map position of the surrounding vehicles in some computational models. For example, the predefined motion model may be based on an assumption that a lateral motion of the surrounding vehicle is slow (or at least much slower than the longitudinal motion of the surrounding vehicle). In other words, it is assumed that the changes in longitudinal position (along the main extension axis of the road) are much greater than the changes in lateral position (sideways motion).

Yet further, in accordance with a second aspect of the present invention, there is provided a vehicle control system for determining a map position of an ego-vehicle, the system comprising a localization system configured to determine a set of geographical coordinates of the ego-vehicle and an orientation of the ego-vehicle. The system further comprises a vehicle perception system comprising at least one sensor for detecting objects that are external to the ego-vehicle. The system further comprises a vehicle control unit connected to the localization system and the vehicle perception system, wherein the vehicle control unit is configured to acquire map data comprising a road geometry of a surrounding environment of the ego-vehicle. The vehicle control unit is further configured to estimate a geographical position of the ego-vehicle by means of the localization system. The vehicle control unit is further configured to initialize at least one dynamic landmark by measuring, by means of the vehicle perception system, a position and velocity, relative to the ego-vehicle, of a surrounding vehicle located in the surrounding environment, and determining a first map position of the surrounding vehicle based on the geographical position of the ego-vehicle and the measured position of the surrounding vehicle. The system further comprises predict a second map position of the surrounding vehicle based on the determined first map position of the surrounding vehicle, the measured velocity of the surrounding vehicle, and the road geometry. The system further comprises measure, by means of the localization system, a location of the ego-vehicle relative to the surrounding vehicle, when the surrounding vehicle is estimated to be at the second map position and update the estimated geographical position of the ego-vehicle based on the predicted second map position of the surrounding vehicle and the measured location of the surrounding vehicle.

With this aspect of the invention, similar advantages and preferred features are present as in the previously discussed first aspect of the invention, and vice versa.

The vehicle control unit can be provided by means of appropriate software, hardware or a combination thereof. Moreover, the term "connected to" is in the present context to be interpreted broadly and can be understood as in communicative connection. Accordingly, two units/entities capable of directly or indirectly exchanging data between each other are considered to be connected to each other. For example, the vehicle control unit may retrieve data directly from the localization system and the perception system, or via a central processor.

Further, in accordance with another aspect of the present invention, there is provided a vehicle comprising a vehicle control system according to the second aspect of the present invention. With this aspect of the invention, similar advantages and preferred features are present as in the previously discussed aspects of the invention.

Yet further, in accordance with another aspect of the present invention, there is provided a non-transitory computer-readable storage medium storing one or more programs configured to be executed by one or more processors of a vehicle control system, the one or more programs comprising instructions for performing the method according to any one of the embodiments discussed in reference to the first aspect of the present invention. With this aspect of the invention, similar advantages and preferred features are present as in the previously discussed aspects of the invention.

The term ego-vehicle should in the present context be not construed as limiting as to where all or some method steps are to be performed, but instead as a term used to differentiate the "active" vehicle from the other surrounding vehicles. Thus, some or all of the method steps may be executed by a processor internally in the vehicle, by an external processor of an external entity (e.g. cloud based solution), or a combination thereof.

These and other features and advantages of the present invention will in the following be further clarified with reference to the embodiments described hereinafter.

BRIEF DESCRIPTION OF FIGURES

For exemplifying purposes, the invention will be described in closer detail in the following with reference to embodiments thereof illustrated in the attached drawings, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. Even though the following disclosure may be more directed towards vehicles in the form of cars, the invention is applicable in other types of vehicles such as busses, trucks, etc.

Figure 1:
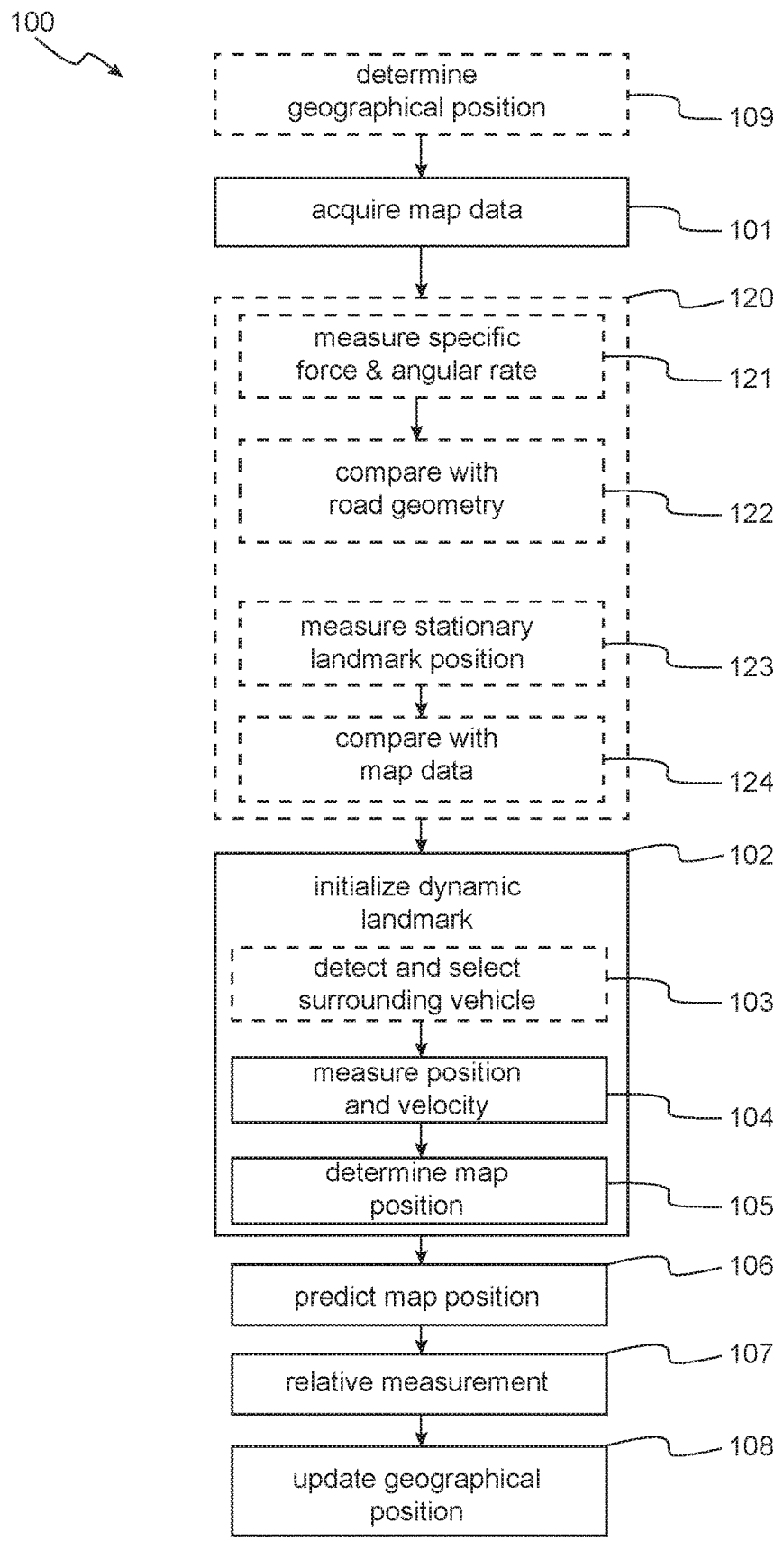
FIG. 1 is a flow-chart representation of a method for determining a map position of an ego-vehicle in accordance with an embodiment of the present invention.

FIG. 1 illustrates a flow chart-representation of a method 100 for estimating/determining a map position of an ego-vehicle, where the ego-vehicle has a predefined geographical position which includes a set of geographical coordinates of the ego-vehicle. The predefined geographical position may for example be determined 109 by means of a GNSS system, a vehicle IMU (inertial measurement unit) system, a landmark measurement positioning system, or a combination thereof.

The method further includes a step of acquiring 101 map data which comprises a road geometry of a surrounding environment. The road geometry includes a representation for the positional road map data (e.g., road centre or lane centre), and/or a representation for the road shape (i.e., curvature and/or heading). Naturally, some of the alternative ways of determining a geographical position of the ego-vehicle may require that some map data. For example when one estimates a geographical position by using IMU data or landmarks. Thus, the initial rough estimation of a geographical position may be performed by a GNSS system, where after the estimation may be improved by the use of map data and additional measurement techniques (e.g. IMU data and landmark measurements).

In particular, the determining of the set of geographical coordinates may be done by measuring 121 the ego-vehicle's specific force and angular rate (e.g. by means of an IMU), and comparing 122 the measured specific force and angular rate with the road geometry in order to determine the geographical coordinates of the ego-vehicle. Moreover, additionally or alternatively, the map data may comprise coordinates for at least one stationary landmark in the surrounding environment in the surrounding environment, and the set of geographical coordinates may accordingly be determined by measuring 123 a stationary landmark position, and comparing 124 the measured stationary landmark position with the stationary landmark location coordinates.

Further, at least one dynamic landmark is initialized 102. The initialization step includes measuring 104 a position and a velocity, relative to the ego-vehicle, of a surrounding vehicle located in the surrounding environment of the ego-vehicle. Then, a first map position of the surrounding vehicle is determined 105. The computation is based on the measured position of the surrounding vehicle and the geographical position of the ego-vehicle. In more detail, this step can be construed as a coordinate transformation, where a measurement in the ego-vehicles local coordinate system (relative position) is transformed to a global coordinate system (e.g. GPS position).

The dynamic landmark initialization 102 may further include a selection process, in which a surrounding vehicle is detected and selected 103 based on a predefined selection criteria. The predefined selection criteria may include one or more of the velocity of the surrounding vehicle is V±10%, where V is the velocity of the ego-vehicle, a traveling direction of the surrounding vehicle is substantially the same as the ego-vehicle and a relative distance between the surrounding vehicle and the ego-vehicle is below a predefined threshold distance.

Accordingly, the measurement step 104 and determination step 105 may then only be performed on the selected surrounding vehicles which can conserve processing power and increase the overall accuracy of the localization/positioning method since more suitable dynamic landmarks may be "tracked". By using suitable dynamic landmarks, one can use individual surrounding vehicles for a longer period of time, which increases robustness since there is a reduced amount of "new" dynamic landmarks constantly introduced in the localization process. In other words, by increasing the probability of using the same dynamic landmark for a longer period of time, the localization/positioning method is rendered more stable and reliable.

Moreover, the combination of dynamic landmarks and stationary landmarks can be used for increasing the accuracy of the ego-vehicle geographical position estimation, and specifically to increase robustness of the overall positioning method 100 for scenarios where there are none or only a few stationary landmarks available.

Furthermore, the method 100 may comprise a weighting process, wherein the positioning determining by means of dynamic landmarks and the positioning determining by means of stationary landmarks are weighted with different factors depending on a predefined weighting criteria. The weighting criteria may for example be data quality or data availability in terms of how many dynamic/stationary landmarks are available in the surrounding environment, and of what quality.

Further, a second map position of each surrounding vehicle (each initialized dynamic landmark) is predicted 106. The prediction is based on the determined first map position of the surrounding vehicle(s), the measured velocity of the surrounding vehicle(s) and the road geometry (part of the map data). The method 100 further comprises measuring 107 a location, relative to the ego-vehicle, of each surrounding vehicle at a point in time when each surrounding vehicle is estimated to be at the second map position. Subsequently, the geographical position of the ego-vehicle is updated 108 based on the predicted second map position of each surrounding vehicle and the measured location of each surrounding vehicle. In other words, the relative measurement 107 is transformed from a local coordinate system of the ego-vehicle to a global coordinate system (e.g. GPS).

Thus, once the dynamic landmarks are initialized it is possible to compute the ego-vehicle's position in the map (geographical position) solely based on predicted map positions and relative measurements, at least temporarily. Naturally, new dynamic landmarks may be continuously initialized and "tracked", and initialized dynamic landmarks may drop off during a trip due to varying conditions and changes in the surrounding environment. Moreover, already initialized dynamic landmarks may be re-initialized if it is noticed that the geographical position of the ego-vehicle as determined based on the dynamic landmark(s) does not correlate well with GNSS measurements and/or static landmark measurements.

Figure 2:
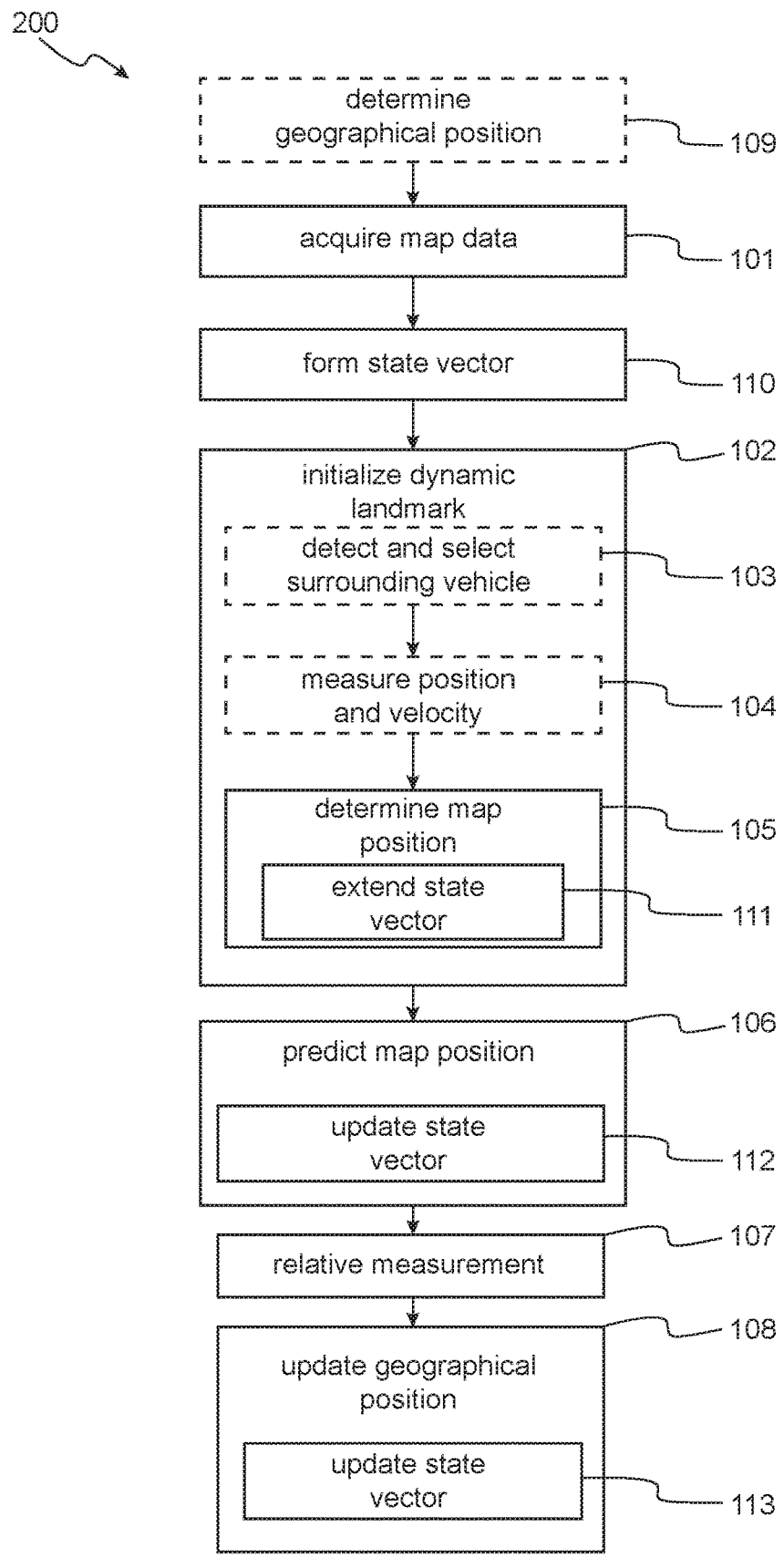
FIG. 2 is a flow-chart representation of a method for determining a map position of an ego-vehicle in accordance with another embodiment of the present invention.

FIG. 2 shows another flowchart representation of a method for determining a map position of an ego-vehicle in accordance with an embodiment of the present invention. Several steps of the method 200 are same as in the previously discussed embodiment in reference to FIG. 1, and will for the sake of conciseness not be repeated. Similarly, the ego-vehicle is assumed to have a known geographical position which includes a set of geographical coordinates and, optionally, an orientation of the vehicle. However, the method may include steps of determining/estimating the geographical position as already exemplified.

Moving on, the method 200 includes a step of acquiring 101 map data, and forming 110 a state vector for the ego-vehicle. The state vector comprises a set of ego-vehicle elements representative of the geographical coordinates of the ego-vehicle and an orientation of the ego-vehicle, in other words the state vector can be said to contain a pose of the ego-vehicle (position and orientation). In more detail, the method 200 can be construed as a positioning filter having a state vector x, that contains a 2D Cartesian position ($\xi_x$, $\xi_y$) and an orientation $\theta$ of the ego-vehicle. Naturally, as already realized by the skilled reader the state vector may also contain a 3D Cartesian position and three different orientations/angles (between each axis) Nevertheless, continuing the former 2D example, the state vector can be expressed as:

$$x=[\xi_x,\xi_Y,\theta]^T \quad (1)$$

An estimate, x, of the state vector can be computed by e.g. using a Bayesian filter which requires two types of models. First a process model:

$$x(t+T)=f(x(t),w(t)), \quad (2)$$

which describes how to predict changes in the state vector given a starting state and a white Gaussian process w(t). Moreover, the measured velocity can be construed as deterministic input to the filter:

$$u=[v_1,v_2,\ldots v_N]^T \quad (3)$$

Thus, if one further includes deterministic input (e.g. velocity measurements), then the process model can be constructed as:

$$x(t+T)=f(x(t),u(t),w(t)), \quad (4)$$

Second, a measurement model:

$$z(t)=h(x(t),e(t)), \quad (5)$$

that together with the white Gaussian process e(t) is used to relate sensor observations stored in the vector z(t), with the state vector x(t). The Gaussian process e(t) is in (3) used to model errors in the sensor observations.

Further, the ego-vehicle's geographical position and orientation is estimated together with the map position of the surrounding vehicle(s) in the same filter. Thus, the state vector parametrization is modified to include surrounding traffic in the positioning filter, starting with that one or more dynamic landmarks are initialized 102. The initialization 102 includes measuring 104 a position and a velocity of one or more surrounding vehicles relative to the ego-vehicle (e.g. by means of a radar, LIDAR or any other suitable sensory arrangement of the ego-vehicle). Thus, the relative position of N surrounding vehicles are stored in the measurement vector:

$$z=[(x_1^m,y_1^m),(x_2^m,y_2^m)\ldots(x_N^m,y_N^m)]^T \quad (6)$$

The state vector x may alternatively be extended so to further include the measured velocities $v_i$ it may however be advantageous from a computational perspective to limit the number of elements in the state vector x. The initialization 102 may also include a selection process 103 as described in the foregoing in reference to FIG. 1.

In a further step of the initialization, the surrounding vehicles positions relative to the ego-vehicle are transformed to a geographical/map position. In more detail, a transformation from the ego-vehicle's coordinate system to a global (map) coordinate system is made. In other words, the map position of each surrounding vehicle is determined 105 based on the measured position ($x_i^m$, $y_i^m$) of each surrounding vehicle and the geographical position of the ego-vehicle. Here, the state vector is extended 111 so to include elements representative of the map positions ($X_i$, $Y_i$) of each surrounding vehicle:

$$x = [\xi_X, \xi_Y, (X_1, Y_1), (X_2, Y_2) \ldots (X_N, Y_N)]^T \quad (7)$$

However, in accordance with an exemplary embodiment of the present invention, and in order to enable a prediction model which separates the surrounding vehicle's longitudinal and lateral motion on the road, a road-aligned coordinate system is used. Accordingly, by assuming that the surrounding vehicles change their lateral position on the road slowly (in comparison to their longitudinal position), the state vector parametrization 111 of other vehicles can be described in road coordinates ($R_i^X$, $R_i^Y$). Road coordinates are in the present context considered to represent an example of a "map position". Here, RX is the longitudinal distance along the centre of the ego lane, and RY is the lateral distance relative to the centre of the ego lane, resulting in the following state vector:

$$x = [\xi_X, \xi_Y, \theta, (R_1^X, R_1^Y), (R_2^X, R_2^Y), \ldots (R_N^X, R_N^Y)]^T \quad (8)$$

In order to make predictions of future position of the surrounding vehicles, a prediction model is used, as described in equations (9) and (10). In more detail, the lateral position can be modelled as a random walk model:

$$R_i^X(t+T) = R_i^X(t) + w_X(t), \quad (9)$$

and the longitudinal position can be predicted using the measured velocity of the surrounding vehicle(s):

$$R_i^Y(t+T) = R_i^Y(t) + v_i T + w_Y(t) \quad (10)$$

Accordingly, a second map position of each surrounding vehicle i is predicted 106 based on the determined first map position of each surrounding vehicle, the measured velocity of each surrounding vehicle, and the road geometry, whereby the state vector can be updated 112.

Knowing the predicted map position of the surrounding vehicle(s), a measurement 107 of a location/position ($x_i^m$, $y_i^m$) of each surrounding vehicle is made and the state vector x is again updated 113. In more detail, in order to update 113 the state vector x, the measurement model from equation (5) takes the form of a transformation $\Psi_i(\xi_X, \xi_Y, \theta, (R_i^X, R_i^Y))$ from the road coordinate system ($R_i^X$, $R_i^Y$) to the ego-vehicle coordinate system:

$$(x_i^m, y_i^m) = h_i(\xi_X, \xi_Y, \theta, (R_i^X, R_i^Y), e(t)) \quad (11)$$
$$= \Psi_i(\xi_X, \xi_Y, \theta, (R_i^X, R_i^Y)) + e(t)$$

Stated differently, from the predicted map position ($R_i^X$, $R_i^Y$) of the surrounding vehicle, a measurement 107 of a location/position of each surrounding vehicle is made when each surrounding vehicle is estimated/expected to be at its second map position. However, in this particular example this process can be construed as that the measurement 107 is made and the method includes predicting a map position (in the road coordinate system) for when the measurement is made. In other words, one determines where the surrounding vehicle is "supposed to be" when the measurement is made based on previous measurements and by utilizing equations (9) and (10).

Thus, as the map position of each surrounding vehicle is "known", and the ego-vehicle's relative position in reference to each surrounding vehicle is known, it is possible to treat the surrounding vehicles as a form of landmarks (dynamic landmarks) and update 108 the geographical position of the ego-vehicle based on this information. Here, the updating 108 of the geographical position comprises updating 113 the state vector elements.

In summary, the inventive methods 100, 200 may be understood as that the position of one or more surrounding vehicle is/are firstly determined in a local coordinate system of the ego-vehicle (i.e. the position of each surrounding vehicle is determined in reference to the ego-vehicle). However, since the geographical coordinates of the ego-vehicle are known, the position of the surrounding vehicle in the local coordinate system can be transformed to a global/map coordinate system, and the "dynamic landmarks" can then also be determined in a map. Further, the relative measurement of the surrounding vehicle (position and velocity) is used together with the road geometry to predict/estimate a new map position of each surrounding vehicle. This can be done repeatedly after each measurement of the position and velocity of each surrounding vehicle relative to the ego-vehicle, whereby the surrounding vehicles can be "tracked" on the map. In other words, each measurement after the initialization, of each surrounding vehicle's position relative to the ego-vehicle, can be used to determine/estimate a geographical position of the ego-vehicle and simultaneously to predict the next map position of each surrounding vehicle. The step of predicting the second map position of the surrounding vehicle may further be based on an acceleration of the surrounding vehicle. The acceleration may for example be calculated from the measured velocity of the surrounding vehicle.

Figure 3:
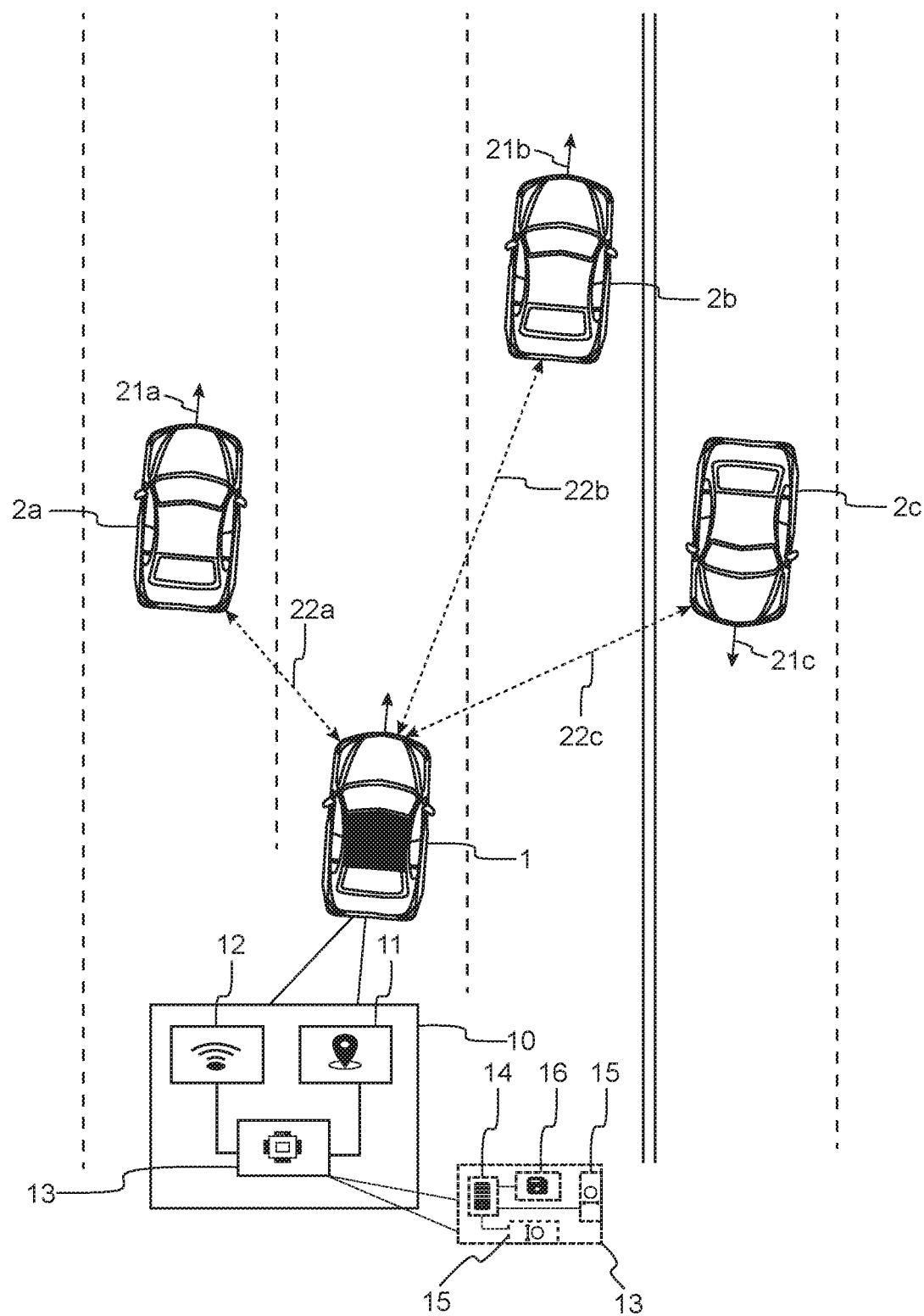
FIG. 3 is a schematic top view representation of vehicle having a vehicle control system for estimating a map position of an ego-vehicle in accordance with an embodiment of the present invention.

FIG. 3 shows a schematic top-view illustration of a vehicle 1 with a vehicle control system 10 in accordance with an embodiment of the present invention. The vehicle 1 having the vehicle control system 10 will in the following be referred to as an ego-vehicle 1. The schematic illustration shows the ego-vehicle on a road with four separate lanes and 3 surrounding vehicles 2a, 2b, 2c. Two of the surrounding vehicles 2a, 2b are traveling in the same direction as the ego-vehicle (i.e. on the same side of the road), while one of the surrounding vehicles 2c is traveling on the opposite side of the road.

The vehicle control system 10 comprises a localization system 11 configured to determine a set of geographical coordinates (i.e. a map position) of the ego-vehicle 1 and an orientation of the ego-vehicle 1. The orientation of the vehicle is the orientation toward which a vehicle travels, that is, a vehicle orientation (a heading orientation). Moreover, the control system 10 has a vehicle perception system 12 comprising at least one sensor (not shown) for detecting and identifying objects that are external to the ego-vehicle 1. The vehicle perception system 12 may for example comprise one or more of a radar arrangement, LIDAR arrangement, and one or more cameras, or any other suitable sensor.

The vehicle control unit 13 may for example be manifested as a general-purpose processor, an application specific processor, a circuit containing processing components, a group of distributed processing components, a group of distributed computers configured for processing, a field programmable gate array (FPGA), etc. The vehicle control unit 13 may further include a microprocessor 14, microcontroller, programmable digital signal processor or another programmable device. The vehicle control unit 13 may also, or instead, include an application-specific integrated circuit (ASIC), a programmable gate array or programmable array logic, a programmable logic device, or a digital signal processor. Where the controller 13 includes a programmable device such as the microprocessor, microcontroller or programmable digital signal processor mentioned above, the processor may further include computer executable code that controls operation of the programmable device.

The processor 14 (of the vehicle control unit 13) may be or include any number of hardware components for conducting data or signal processing or for executing computer code stored in memory 16. The vehicle control unit 13 may have an associated memory 16, and the memory 16 may be one or more devices for storing data and/or computer code for completing or facilitating the various methods described in the present description. The memory 16 may include volatile memory or non-volatile memory. The memory 16 may include database components, object code components, script components, or any other type of information structure for supporting the various activities of the present description. According to an exemplary embodiment, any distributed or local memory device may be utilized with the systems and methods of this description. According to an exemplary embodiment the memory 16 is communicably connected to the processor 14 (e.g., via a circuit or any other wired, wireless, or network connection) and includes computer code for executing one or more processes described herein.

Moving on, the vehicle control system 13 has a vehicle control unit 13 connected to the localization system 11 and the vehicle perception system 12. The control unit is configured to execute a method in accordance with any one of the above discussed embodiments of the present invention. In more detail, the vehicle control unit 13 is configured to acquire map data comprising a road geometry of a surrounding environment of the ego-vehicle. It should be understood that the vehicle control unit 13 may comprise a digital signal processor arranged and configured for digital communication with an off-site server or cloud based server. Thus data may be sent to and from the vehicle control unit 13. Then, a geographical position of the ego-vehicle is determined by means of the localization system 11, which may determine the geographical position by means of a GNSS system, IMU data and the road geometry, and/or through the use of stationary landmarks as already exemplified in the foregoing.

Thus, optionally, depending on functionality provided in the control circuitry one or more communication interfaces 15 and/or one or more antenna interfaces (not shown) may be provided and furthermore, also one or more sensor interfaces (not shown) may be provided for acquiring data from sensors within the vehicle.

It should be appreciated that the communication/antenna interface may also provide the possibility to acquire sensor data directly or via dedicated sensor control circuitry in the vehicle: for instance GPS data may be acquired through the antenna interface, some sensors in the vehicle may communicate with the control circuitry using a local network setup, such as CAN bus, I2C, Ethernet, optical fibres, and so on. The communication interface may be arranged to communicate with other control functions of the vehicle and may thus be seen as control interface also; however, it separate control interface (not shown) may be provided. Local communication within the vehicle may also be of a wireless type with protocols such as WiFi, LoRa, Zigbee, Bluetooth, or similar mid/short range technologies. Next, the control unit is configured to initialize at least one dynamic landmark by Utilizing the vehicle perception system to measure 22a, 22b, 22c a position and velocity, relative to the ego-vehicle 1, of one or more surrounding vehicles 2a, 2b, 2c, located in the surrounding environment and determining a first map position of each surrounding vehicle 22a, 22b, 22c based on the geographical position of the ego-vehicle 1 and the measured positions of the surrounding vehicles 2a, 2b, 2c.

In other words, the control unit 10 is configured to first determine the position of one or more surrounding vehicles 2a, 2b, 2c in a local coordinate system of the ego-vehicle 1, and then to transform this position to a global coordinate system.

Further, the vehicle control unit 10 is configured to predict a second (future) map position of each surrounding vehicle 2a, 2b, 2c. The prediction is based on the determined first map position of each surrounding vehicle 2a, 2b, 2c, the measured velocity of each surrounding vehicle 2a, 2b, 2c, and the road geometry. Then, the localization system is utilized to measure a location of the ego-vehicle relative to the surrounding vehicle 2a, 2b, 2c, when the surrounding vehicle 2a, 2b, 2c is expected/estimated to be at the second map position. Thus, by knowing the ego-vehicle's 1 position relative to the surrounding vehicles 2a, 2b, 2c and at the same time "knowing" where each surrounding vehicle 2a, 2b, 2c is in the map (or at least is supposed to be), it is possible to compute the geographical position of the ego-vehicle 1. Thus, the control unit 10 is configured to update the estimated geographical position of the ego-vehicle based on the predicted second map position of each surrounding vehicle 2a, 2b, 2c, and the measured location of each surrounding vehicle 2a, 2b, 2c.

As previously mentioned, the initialization of the dynamic landmarks may include a detection and selection procedure, in which the control unit 10 is configured to detect and select a surrounding vehicle 2a, 2b, 2c based on a predefined selection criteria. The predefined selection criteria may for example be that the traveling direction 21a, 21b, 21c of the surrounding vehicle 2a, 2b, 2c is substantially the same as for the ego vehicle 1 (i.e. the vehicles are traveling in the same general direction). Accordingly, in FIG. 3, the vehicle control unit 10 may refrain from measuring the position, by means of the localization system 11, of the surrounding vehicle 2c which is traveling in the opposite direction 21c.

Further, the vehicle 1 may be connected to external network(s) via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, V2V, and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to determine the predicted position of the surrounding vehicle and send back information indicating the predicted position and other relevant parameters used in controlling the vehicle.

In summary, an advantage of the presented method is that it allows for an increased robustness/redundancy in a vehicle localization system suitable for autonomous or semi-autonomous driving. In comparison to presently known solutions, the increase in robustness may particularly be achieved in scenarios where there are a few or no landmarks available/detectable, and/or in scenarios where a vehicle sensor is malfunctioning and landmark identifications cannot be performed (while radar measurements of surrounding vehicles are still possible). Sensor malfunction may for example be that one or more cameras of the vehicle are blinded by the sun.

Although the figures may show a specific order of method steps, the order of the steps may differ from what is depicted. In addition, two or more steps may be performed concurrently or with partial concurrence. For example, the prediction step and the location measurement step may be interchanged based on a specific realization as exemplified in the foregoing. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for determining a map position of an ego-vehicle, the ego-vehicle having a geographical position including a set of geographical coordinates of the ego-vehicle, said method comprising:
    acquiring map data comprising a road geometry of a surrounding environment of the ego-vehicle;
    initializing at least one dynamic landmark, by:
        detecting and selecting at least one surrounding vehicle out of a plurality of surrounding vehicles in the surrounding environment of the ego-vehicle that fulfill a predefined one or more selection criteria, the selected at least one surrounding vehicle forming the at least one dynamic landmark;
        measuring a position and velocity, relative to the ego-vehicle, only of the selected at least one surrounding vehicle; and
        determining a first map position only of the selected at least one surrounding vehicle based on the measured position of the selected at least one surrounding vehicle and the geographical position of the ego-vehicle;
    predicting a second map position of the selected at least one surrounding vehicle, based on the determined first map position of the selected at least one surrounding vehicle, the measured velocity of the selected at least one surrounding vehicle, and the road geometry;
    measuring a location, relative to the ego-vehicle, of the selected at least one surrounding vehicle, when the selected at least one surrounding vehicle is estimated to be at the second map position; and
    updating the geographical position of the ego-vehicle based on the predicted second map position of the selected at least one surrounding vehicle and the measured location of the selected at least one surrounding vehicle,
    wherein said predefined one or more selection criteria comprises at least one of:
        the velocity of the selected at least one surrounding vehicle is $V\pm10\%$, where V is the velocity of the ego-vehicle;
        a traveling direction of the selected at least one surrounding vehicle is the same as the ego-vehicle; and
        a relative distance between the selected at least one surrounding vehicle and the ego-vehicle is below a predefined threshold distance.

2. The method according to claim 1, further comprising: determining the set of geographical coordinates of the ego-vehicle by means of a Global Navigation Satellite System, GNSS.

3. The method according to claim 2, further comprising:
determining the set of geographical coordinates of the ego-vehicle by:
measuring the ego-vehicle's IMU data; and
evaluating the IMU data in view of the road geometry in order to determine the set of geographical coordinates of the ego-vehicle.

4. The method according to claim 1, wherein the map data further comprises stationary landmark location coordinates for at least one stationary landmark in the surrounding environment of the ego-vehicle, and wherein the method further comprises:
determining the set of geographical coordinates of the ego-vehicle by:
measuring a stationary landmark position, relative to the ego-vehicle, of the at least one stationary landmark; and
comparing the measured stationary landmark position and the stationary landmark location coordinates.

5. The method according to claim 1, further comprising forming a state vector comprising a set of ego-vehicle elements representative of the geographical coordinates of the ego-vehicle and an orientation of the ego-vehicle.

6. The method according to claim 5, wherein the step of updating the geographical position comprises updating the set of ego-vehicle elements in the state vector.

7. The method according to claim 6, wherein the step of determining the first map position of the selected at least one surrounding vehicle comprises extending the state vector to include new elements representative of the first map position of the selected at least one surrounding vehicle, and
wherein the step of predicting the second map position of the selected at least one surrounding vehicle further comprises updating the elements representative of the determined first map position of the selected at least one surrounding vehicle in the state vector.

8. The method according to claim 1, wherein the step of predicting the second map position of the selected at least one surrounding vehicle is further based on a predefined vehicle motion model.

9. The method according to claim 8, wherein the predefined motion model is based on an assumption that a lateral motion of the selected at least one surrounding vehicle is slower than a longitudinal motion of the selected at least one surrounding vehicle.

10. A non-transitory computer-readable storage medium storing one or more instructions configured to be executed by one or more processors of a vehicle control system, the one or more instructions cause the one or more processors to perform the method according to claim 1.

11. A vehicle control system for determining a map position of an ego-vehicle, the system comprising:
a localization system configured to determine a set of geographical coordinates of the ego-vehicle and an orientation of the ego-vehicle;
a vehicle perception system comprising at least one sensor for detecting objects that are external to the ego-vehicle;
a vehicle control circuitry connected to the localization system and the vehicle perception system, wherein the vehicle control circuitry is configured to:
acquire map data comprising a road geometry of a surrounding environment of the ego-vehicle;
estimate a geographical position of the ego-vehicle by means of the localization system;
initialize at least one dynamic landmark by:
detecting and selecting at least one surrounding vehicle out of a plurality of surrounding vehicles in the surrounding environment of the ego-vehicle that fulfill a predefined one or more selection criteria, the selected at least one surrounding vehicle forming the at least one dynamic landmark,
measuring, by means of the vehicle perception system, a position and velocity, relative to the ego-vehicle, only of the selected at least one surrounding vehicle, and
determining a first map position only of the selected at least one surrounding vehicle based on the geographical position of the ego-vehicle and the measured position of the selected at least one surrounding vehicle;
predict a second map position of the selected at least one surrounding vehicle based on the determined first map position of the selected at least one surrounding vehicle, the measured velocity of the selected at least one surrounding vehicle, and the road geometry;
measure, by means of the localization system, a location of the ego-vehicle relative to the selected at least one surrounding vehicle, when the selected at least one surrounding vehicle is estimated to be at the second map position; and
update the estimated geographical position of the ego-vehicle based on the predicted second map position of the selected at least one surrounding vehicle and the measured location of the selected at least one surrounding vehicle,
wherein said predefined one or more selection criteria comprises at least one of:
the velocity of the selected at least one surrounding vehicle is V±10%, where V is the velocity of the ego-vehicle;
a traveling direction of the selected at least one surrounding vehicle is the same as the ego-vehicle; and
a relative distance between the selected at least one surrounding vehicle and the ego-vehicle is below a predefined threshold distance.

12. An ego-vehicle comprising the vehicle control system according to claim 11.

* * * * *